（12) United States Patent
Tien et al.

(10) Patent No.: US 9,019,480 B2
(45) Date of Patent: Apr. 28, 2015

(54) TIME-OF-FLIGHT (TOF) SYSTEM, SENSOR PIXEL, AND METHOD

(71) Applicant: JDS Uniphase Corporation, Milpitas, CA (US)

(72) Inventors: An-Chun Tien, San Jose, CA (US); Lucas Morales, San Francisco, CA (US); Vincent V. Wong, Los Altos, CA (US); Bryed Billerbeck, Cupertino, CA (US)

(73) Assignee: JDS Uniphase Corporation, Milpitas, CA (US)

( * ) Notice: Subject to any disclaimer, the term of this patent is extended or adjusted under 35 U.S.C. 154(b) by 42 days.

(21) Appl. No.: 13/777,697

(22) Filed: Feb. 26, 2013

(65) Prior Publication Data

US 2014/0240692 A1    Aug. 28, 2014

(51) Int. Cl.
*G01C 3/08* (2006.01)
*G01S 7/486* (2006.01)
*G01S 17/89* (2006.01)

(52) U.S. Cl.
CPC ............ *G01S 7/4865* (2013.01); *G01S 17/89* (2013.01); *G01S 7/4863* (2013.01)

(58) Field of Classification Search
USPC .......................................................... 356/5.01
See application file for complete search history.

(56) References Cited

U.S. PATENT DOCUMENTS

| 6,700,391 | B2 * | 3/2004 | Strack et al. .................. 324/662 |
| 6,906,793 | B2 | 6/2005 | Bamji et al. ................ 356/141.1 |
| 6,919,549 | B2 | 7/2005 | Bamji et al. ................ 250/208.1 |
| 7,157,685 | B2 | 1/2007 | Bamji et al. ................ 250/214 A |
| 7,176,438 | B2 | 2/2007 | Bamji et al. ................ 250/214 A |
| 7,268,858 | B2 | 9/2007 | Kuijk et al. .................... 356/5.01 |
| 7,321,111 | B2 | 1/2008 | Bamji et al. ................ 250/214 A |
| 7,683,954 | B2 * | 3/2010 | Ichikawa et al. .............. 348/308 |
| 7,791,715 | B1 | 9/2010 | Bamji ............................ 356/5.1 |
| 8,587,773 | B2 * | 11/2013 | Bamji et al. ................... 356/5.01 |
| 8,638,108 | B2 * | 1/2014 | Nielsen et al. ................. 324/662 |
| 2011/0058153 | A1 | 3/2011 | Van Nieuwenhove et al. ............................ 356/5.01 |
| 2011/0188028 | A1 | 8/2011 | Hui et al. ...................... 356/5.01 |
| 2013/0114064 | A1 * | 5/2013 | Bamji et al. ................... 356/5.01 |

OTHER PUBLICATIONS

Luke, The Origins of Sampling Theorem, 1999, IEEE Communications Magazine, 106-108.*

* cited by examiner

*Primary Examiner* — Luke Ratcliffe
*Assistant Examiner* — Vicente Rodriguez
(74) *Attorney, Agent, or Firm* — JDS Uniphase Corporation

(57) ABSTRACT

A time-of-flight (TOF) sensor pixel is provided that performs in-pixel subtraction. The TOF sensor pixel includes a photodetector, a capacitor, and circuitry. The photodetector detects light pulses emitted at a clock frequency, after a time of flight, to provide a photocurrent. The capacitor integrates the photocurrent over an integration period, while the circuitry reverses a flow direction of the photocurrent through the capacitor at twice the clock frequency. At the end of the integration period, the capacitor provides a differential photocharge, corresponding to a capacitor voltage. The capacitor voltage is related to the time of flight of the light pulses and may be used to determine a distance to a target.

20 Claims, 4 Drawing Sheets

TIME-OF-FLIGHT (TOF) SYSTEM, SENSOR PIXEL, AND METHOD

TECHNICAL FIELD OF THE INVENTION

The present invention relates to a time-of-flight (TOF) system, sensor pixel, and method. More particularly, the present invention relates to a TOF system, sensor pixel, and method in which a capacitor provides a differential photocharge.

BACKGROUND OF THE INVENTION

A time-of-flight (TOF) system, typically, includes a light source and a TOF sensor. The light source emits light pulses towards a target, which reflects the light pulses back towards the TOF sensor. The TOF sensor receives the light pulses after a time of flight, which is proportional to the distance from the TOF system to the target.

The TOF sensor includes a plurality of TOF sensor pixels. A conventional TOF sensor pixel 100 is illustrated in FIG. 1A, and a timing diagram for the TOF sensor pixel 100 is illustrated in FIG. 1B. The TOF sensor pixel 100 includes a photodetector 150, a first capacitor 160, a second capacitor 161, a first switch 170, and a second switch 171. An example of such a TOF sensor pixel is described in U.S. Pat. No. 7,683,954 to Ichikawa et al., issued on Mar. 23, 2010, which is incorporated herein by reference.

The photodetector 150 detects the light pulses emitted by the light source in response to a clock signal 101, as well as background light, to provide a photocurrent 102. The first switch 170 is controlled by a first control signal $\Phi_A$, which is, typically, the clock signal 101. The second switch 171 is controlled by a second control signal $\Phi_{\overline{A}}$, which is, typically, an inverted clock signal (not shown). During the high portion of each clock cycle, the first switch 170 closes, connecting the photodetector 150 to the first capacitor 160. During the low portion of each clock cycle, the second switch 171 closes, connecting the photodetector 150 to the second capacitor 161.

Because of the time of flight, a first contribution to the photocurrent 102 from each light pulse is received by the first capacitor 160, and a second contribution from each light pulse is received by the second capacitor 161. A contribution to the photocurrent 102 from the background light is received by both the first capacitor 160 and the second capacitor 161.

The first capacitor 160 integrates the photocurrent 102 during the high portion of each clock cycle, over an integration period, to provide a first photocharge 103 of A+B, where A represents a first contribution from the light pulses, and B represents a contribution from the background light. The second capacitor 161 integrates the photocurrent 102 during the low portion of each clock cycle, over the integration period, to provide a second photocharge 104 of $\overline{A}$+B, where $\overline{A}$ represents a second contribution from the light pulses. The difference 105 of A−$\overline{A}$ between the first photocharge 103 and the second photocharge 104 at the end of the integration period is related to the time of flight of the light pulses.

However, the contribution from the background light to the first photocharge 103 and the second photocharge 104 is, generally, much larger than the first and second contributions from the light pulses. Therefore, the first capacitor 160 and the second capacitor 161 may easily become saturated during the integration period. The large contribution from the background light also decreases the signal-to-noise ratio.

Furthermore, at the end of the integration period, two separate capacitor voltages, corresponding to the first photocharge 103 and the second photocharge 104, must be stored and processed. Moreover, to correct for distance aliasing, a second integration period is, generally, carried out, requiring that four separate capacitor voltages be stored and processed. These storage and processing requirements increase the system cost, in terms of memory, and the system latency.

Consequently, TOF sensor pixels have been developed in which a capacitor provides a differential photocharge, rather than separate first and second photocharges. In other words, these TOF sensor pixels perform in-pixel subtraction. Examples of such TOF sensor pixels are described in U.S. Pat. No. 6,919,549 to Bamji, et al., issued on Jul. 19, 2005, in U.S. Pat. No. 7,157,685 to Bamji, et al., issued on Jan. 2, 2007, in U.S. Pat. No. 7,176,438 to Bamji, et al., issued on Feb. 13, 2007, in U.S. Pat. No. 7,321,111 to Bamji, et al., issued on Jan. 22, 2008, in U.S. Pat. No. 7,683,954 to Ichikawa et al., issued on Mar. 23, 2010, and in U.S. Patent Application Publication No. 2011/0058153 to Van Nieuwenhove, et al., published on Mar. 10, 2011, which are incorporated herein by reference.

However, in these TOF sensor pixels, the in-pixel subtraction is only performed after a time period of several clock cycles. Therefore, measures must be taken to avoid capacitor saturation, adding to the complexity of the TOF sensor pixels. For example, a time period shorter than the integration period may be implemented by using a separate counter, or saturation threshold detection may be implemented by using a comparator. Furthermore, many of the TOF sensor pixels include multiple capacitors, and some further include multiple photodetectors. A simpler TOF sensor pixel that performs in-pixel subtraction is desirable.

SUMMARY OF THE INVENTION

Accordingly, the present invention relates to a time-of-flight (TOF) system, comprising: a light source for emitting light pulses at a clock frequency; and a TOF sensor including one or more TOF sensor pixels, each TOF sensor pixel including: a photodetector for detecting the light pulses, after a time of flight, to provide a photocurrent; a capacitor for integrating the photocurrent, over a first integration period, to provide a first-period photocharge, corresponding to a first-period capacitor voltage, at an end of the first integration period; and circuitry for reversing a flow direction of the photocurrent through the capacitor at twice the clock frequency, during the first integration period, so that the first-period photocharge is a differential photocharge, and the first-period capacitor voltage is related to the time of flight of the light pulses.

Another aspect of the present invention relates to a TOF sensor pixel, comprising: a photodetector for detecting light pulses emitted at a clock frequency, after a time of flight, to provide a photocurrent; a capacitor for integrating the photocurrent, over a first integration period, to provide a first-period photocharge, corresponding to a first-period capacitor voltage, at an end of the first integration period; and circuitry for reversing a flow direction of the photocurrent through the capacitor at twice the clock frequency, during the first integration period, so that the first-period photocharge is a differential photocharge, and the first-period capacitor voltage is related to the time of flight of the light pulses.

Another aspect of the present invention relates to a method of determining a distance to a target, comprising: emitting light pulses towards a target at a clock frequency; detecting the light pulses reflected from the target, after a time of flight, to provide a photocurrent; integrating the photocurrent with a capacitor, over a first integration period, to provide a first-period photocharge, corresponding to a first-period capacitor voltage, at an end of the first integration period; reversing a flow direction of the photocurrent through the capacitor at twice the clock frequency, during the first integration period, so that the first-period photocharge is a differential photocharge, and the first-period capacitor voltage is related to the time of flight of the light pulses; and determining a distance to the target by using the first-period capacitor voltage.

BRIEF DESCRIPTION OF THE DRAWINGS

The present invention will be described in greater detail with reference to the accompanying drawings wherein.

DETAILED DESCRIPTION OF THE INVENTION

Figure 1A:
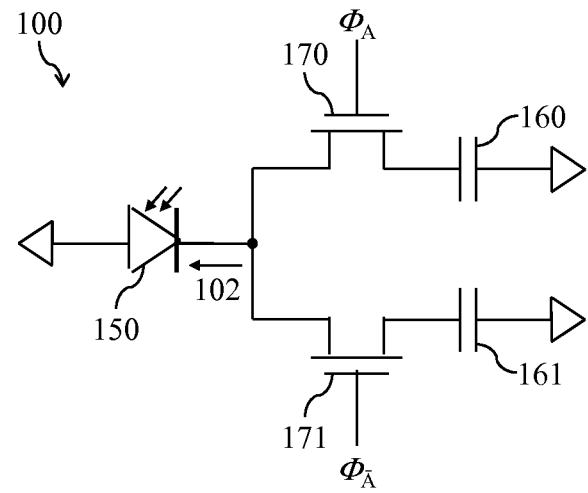
FIG. 1A is a circuit diagram of a conventional time-of-flight (TOF) sensor pixel.
Figure 1B:
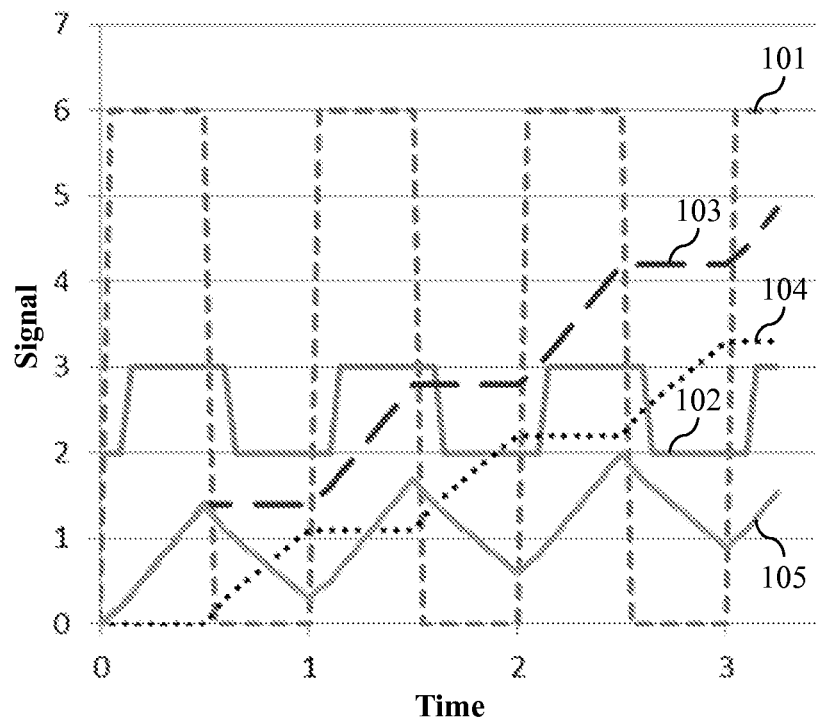
FIG. 1B is a timing diagram for the conventional TOF sensor pixel of FIG. 1A.
Figure 2:
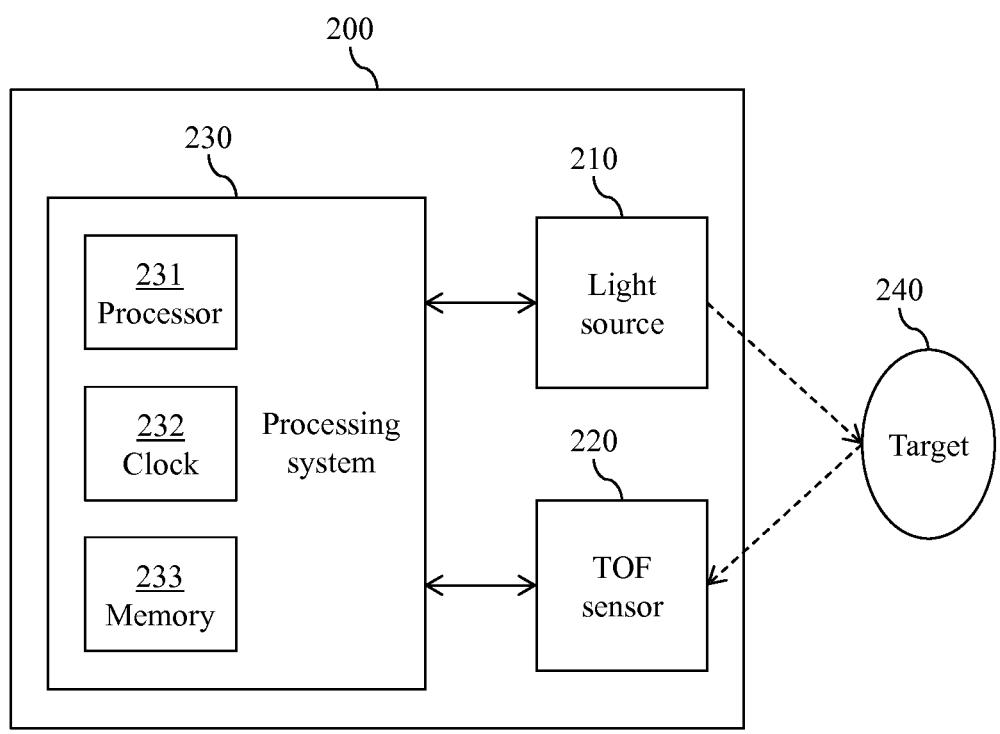
FIG. 2 is a block diagram of an exemplary embodiment of a TOF system according to the present invention.

The present invention provides a time-of-flight (TOF) system, sensor pixel, and method. With reference to FIG. 2, an exemplary embodiment of the TOF system 200 includes a light source 210, a TOF sensor 220, and a processing system 230. Note that other elements commonly included in a TOF system, such as optics, are omitted for simplicity of illustration.

The TOF system 200 is, generally, an imaging system. For example, the TOF system 200 may be a depth camera, a gesture recognition system, a medical imaging system, a machine vision system, or an automotive imaging system, such as an out-of-position detection system, a parking assistance system, or a collision avoidance system. Alternatively, the TOF system 200 may be a proximity sensor.

The processing system 230 is connected to both the light source 210 and the TOF sensor 220. In the illustrated embodiment, the processing system 230 is a processor-based system, including a processor 231, such as a digital signal processor (DSP) or a microprocessor. Alternatively, the processing system 230 may be an application-specific integrated circuit (ASIC) based system, or a field-programmable gate array (FPGA) based system. The processing system 230 also includes a clock 232, such as a crystal oscillator/phase-locked loop (PLL), and a memory 233. Note that other elements commonly included in a processing system are omitted for simplicity of illustration.

The light source 210 includes one or more light-emitting elements. Typically, the one or more light-emitting elements are light-emitting diodes (LEDs) or lasers. For example, the light source 210 may be an LED array, a laser diode, or a laser diode array. Preferably, the light source 210 emits at a wavelength in the near-infrared spectral range, between about 700 nm and about 1400 nm.

The light source 210 emits light pulses, i.e., periodically modulated light, at a pulse frequency equal to a clock frequency. Typically, the light source 210 receives a clock signal 301 from the clock 232 of the processing system 230 and emits the light pulses in response to the clock signal 301. The clock frequency is, typically, between about 1 MHz and about 1 GHz. Preferably, the clock frequency is between about 20 MHz and about 500 MHz. Accordingly, the clock period is, preferably, between about 2 ns and about 50 ns, corresponding to a pulse length between about 0.3 m and about 7.5 m. Preferably, the light pulses have a square waveform. Alternatively, the light pulses may have a sinusoidal waveform or any other suitable waveform.

In operation, the light source 210 emits the light pulses towards a target 240, which reflects the light pulses back towards the TOF sensor 220. The TOF sensor 220 receives the reflected light pulses, after a time of flight, which is proportional to the distance from the TOF system 200 to the target 240.

A bandpass filter (not shown) is, typically, used to pass light in a relatively narrow wavelength band around the emission wavelength of the light source 210 to the TOF sensor 220. However, in addition to the light pulses, background light, i.e., ambient light, in this wavelength band also reaches the TOF sensor 220. Advantageously, because of the improved signal-to-noise ratio of the TOF sensor 220, the bandwidth requirement for the bandpass filter may be relaxed.

Figure 3A:
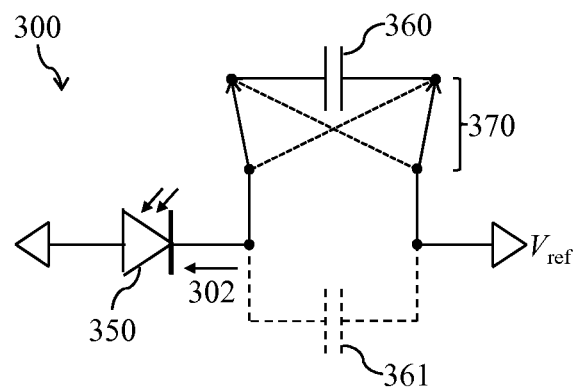
FIG. 3A is a simplified circuit diagram of an exemplary embodiment of a TOF sensor pixel according to the present invention.

With reference to FIG. 3A, the TOF sensor 220 includes one or more TOF sensor pixels 300. Typically, the TOF sensor 220 includes a plurality of TOF sensor pixels 300. For example, the TOF sensor 220 may be a depth image sensor including a two-dimensional array of TOF sensor pixels 300.

Each TOF sensor pixel 300 includes a photodetector 350, a first capacitor 360, and circuitry 370. Usually, the TOF sensor pixel 300 includes a single photodetector 350 for providing a photocurrent 302 and a single capacitor 360 for integrating the photocurrent 302. However, in some embodiments, the TOF sensor pixel 300 may also include an optional second capacitor 361. Note that other elements commonly included in a TOF sensor pixel, such as a read-out circuitry, are omitted for simplicity of illustration The photodetector 350 is, typically, a photodiode. The first capacitor 360 and the optional second capacitor 361 are, typically, on-chip capacitors. The circuitry 370 is, generally, switching circuitry including a plurality of switches, i.e., switching elements. Typically, the switches are transistors. Preferably, the switches are n-type metal oxide semiconductor (NMOS) transistors, p-type metal oxide semiconductor (PMOS) transistors, or a combination thereof.

Figure 3B:
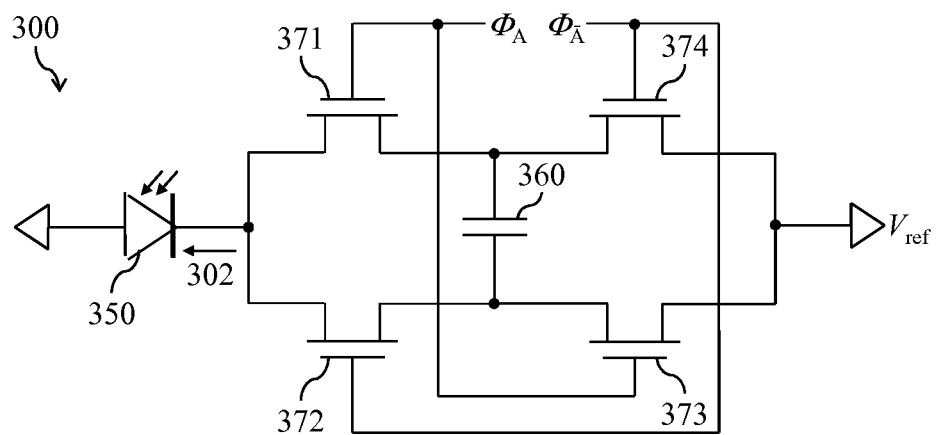
FIG. 3B is a circuit diagram of an exemplary embodiment of a TOF sensor pixel according to the present invention.

In the exemplary embodiment illustrated in FIG. 3B, the circuitry 370 includes a first switch 371, a second switch 372, a third switch 373, and a fourth switch 374, all of which are NMOS transistors. A first set of switches, consisting of the first switch 371 and the third switch 373, each have a control input for receiving a first control signal $\Phi_A$. A second set of switches, consisting of the second switch 372 and the fourth switch 374, each have a control input for receiving a second control signal $\Phi_{\bar{A}}$. In other words, the first set of switches is controlled by the first control signal $\Phi_A$, and the second set of switches is controlled by the second control signal $\Phi_{\bar{A}}$.

The first control signal $\Phi_A$ and the second control signal $\Phi_{\bar{A}}$ are complementary, each having a frequency equal to the clock frequency at which the light pulses are emitted by the light source 210. Typically, the first control signal $\Phi_A$ is the clock signal 301 used to modulate the light source 210, with or without a phase delay.

In operation, the TOF sensor pixel 300 is first initialized by both the first control signal $\Phi_A$ and the second control signal $\Phi_{\bar{A}}$ going high to close both sets of switches. The capacitor 360 is discharged, and the initial capacitor voltage is set to zero. This initialization is, generally, repeated after each integration period.

It should be noted that, in other embodiments, the circuitry 370 may have other capacitor switching configurations so that the initial capacitor voltage is set to a nonzero value, for example, half of the maximum allowable voltage swing of the first capacitor 360. However, such switching configurations may require additional switches, adding to the component count and, therefore, increasing the sensor size.

Figure 3C:
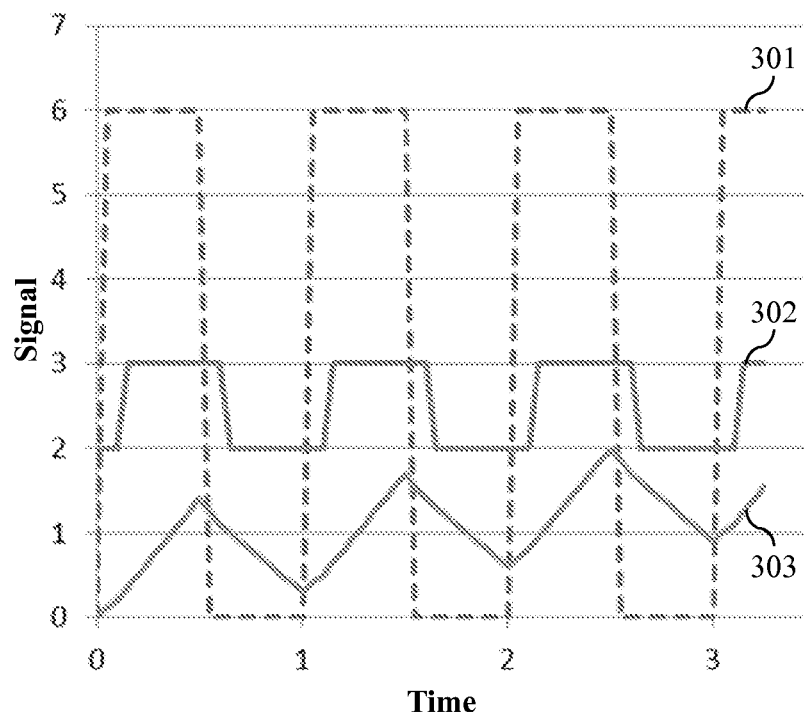
FIG. 3C is a timing diagram for the TOF sensor pixel of FIG. 3B during a first integration period.
Figure 3D:
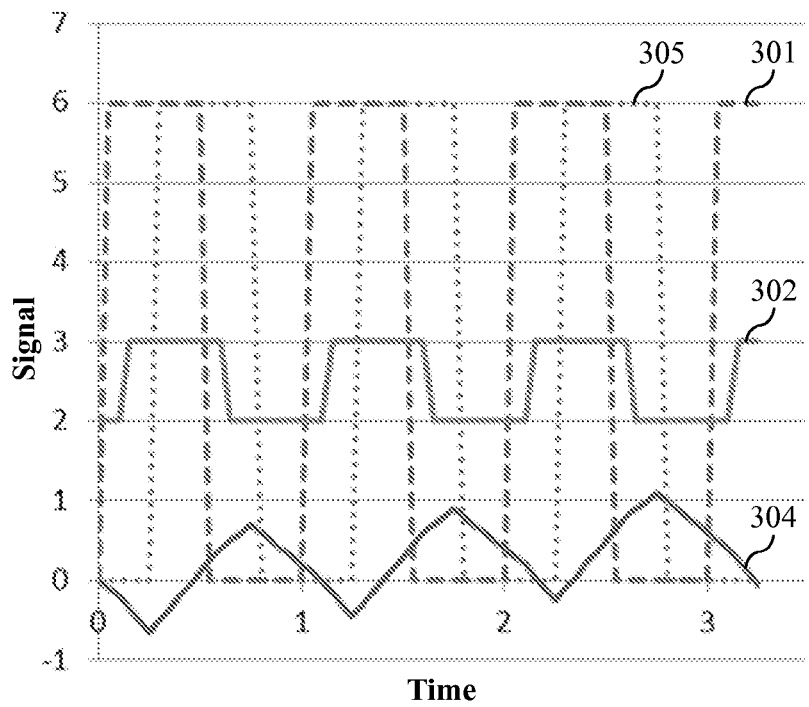
FIG. 3D is a timing diagram for the TOF sensor pixel of FIG. 3B during a second integration period.

Exemplary timing diagrams for the TOF sensor pixel 300 during a first integration period and a second integration period are illustrated in FIGS. 3C and 3D, respectively. During each integration period, the photodetector 350 detects the light pulses emitted by the light source 210 in response to the clock signal 301, as well as background light, to provide a photocurrent 302. Accordingly, the photocurrent 302 has a contribution from the light pulses and a contribution from the background light.

The first capacitor 360 integrates the photocurrent 302 as the circuitry 370 reverses the flow direction of the photocurrent 302 through the first capacitor 360 in response to the first control signal $\Phi_A$ and the second control signal $\Phi_{\bar{A}}$, providing a differential photocharge 303 or 304 having substantially no contribution from the background light. In contrast, the optional second capacitor 361 integrates the photocurrent 302 without any reversal in flow direction, providing a total photocharge (not shown), which may be used for functions such as automatic gain control.

During the first integration period (FIG. 3C), the first control signal $\Phi_A$ is the clock signal 301 used to modulate the light source 210, and the second control signal $\Phi_{\bar{A}}$ is a 180°-phase-delayed clock signal (not shown), i.e., an inverted clock signal. During the second integration period (FIG. 3D), the first control signal $\Phi_A$ is a 90°-phase-delayed clock signal 305 used to modulate the light source 210, and the second control signal $\Phi_{\bar{A}}$ is a 270°-phase-delayed clock signal (not shown).

As mentioned heretofore, the first control signal $\Phi_A$ and the second control signal $\Phi_{\bar{A}}$ are complementary, meaning that when one control signal goes high, the other goes low. When the first control signal $\Phi_A$ goes high and the second control signal $\Phi_{\bar{A}}$ goes low, i.e., during the high portion of each clock cycle (FIG. 3C) or 90°-phase-delayed clock cycle (FIG. 3D), the first set of switches closes, and the second set of switches opens. The first switch 371 connects the photodetector 350 to the first capacitor 360, and the third switch 373 connects the first capacitor 360 to the reference voltage $V_{ref}$.

The optimal reference voltage $V_{ref}$ depends on what the initial capacitor voltage is after initialization, i.e., reset, and on how offset correction is done at the read-out stage. In some instances the reference voltage $V_{ref}$ is chosen to be half the maximum allowable voltage swing of the first capacitor 360.

When the first control signal $\Phi_A$ goes low and the second control signal $\Phi_{\bar{A}}$ goes high, i.e., during the low portion of each clock cycle (FIG. 3C) or 90°-phase-delayed clock cycle (FIG. 3D), the first set of switches opens, and the second set of switches closes. The second switch 372 connects the photodetector 350 to the first capacitor 360, and the fourth switch 374 connects the first capacitor 360 to the reference voltage $V_{ref}$.

Note that the flow direction of the photocurrent 302 through the first capacitor 360, i.e., the voltage polarity of the first capacitor 360, is opposite during the high and low portions of the clock cycle (FIG. 3C) or the 90°-phase-delayed clock cycle (FIG. 3D). Therefore, the flow direction of the photocurrent 302 through the first capacitor 360 is reversed, i.e., switched, at twice the clock frequency.

Because of the time of flight of the light pulses, a first contribution to the photocurrent 302 from each light pulse is received by the first capacitor 360 during the high portion of each clock cycle (FIG. 3C) or 90°-phase-delayed clock cycle (FIG. 3D), and a second contribution from each light pulse is received during the low portion of each clock cycle (FIG. 3C) or 90°-phase-delayed clock cycle (FIG. 3D). On the other hand, a contribution to the photocurrent 302 from the background light is assumed to remain substantially constant over each clock cycle (FIG. 3C) or 90°-phase-delayed clock cycle (FIG. 3D).

During the high portion of each clock cycle (FIG. 3C) or 90°-phase-delayed clock cycle (FIG. 3D), the first capacitor 360 accumulates a photocharge of A+B, where A represents a first contribution from the light pulse, and B represents a contribution from the background light. During the low portion of each clock cycle (FIG. 3C) or 90°-phase-delayed clock cycle (FIG. 3D), the flow direction of the photocurrent 302 through the first capacitor 360 is opposite, and the first capacitor 360 accumulates a photocharge of $-(\bar{A}+B)$, where $\bar{A}$ represents a second contribution from the light pulse. Thus, after a full clock cycle (FIG. 3C) or 90°-phase-delayed clock cycle (FIG. 3D), the first capacitor 360 has accumulated a differential photocharge 303 or 304 of $A-\bar{A}$. Advantageously, in-pixel subtraction has been performed, and the contribution B from the background light has been substantially eliminated.

Each integration period consists of a large number of clock cycles, typically, greater than 1000 clock cycles. Preferably, the number of clock cycles is an integer. The timing of each integration period may be controlled by using a counter to count the clock cycles. The integration period is, typically, between about 1 ms and about 10 ms, whereas the clock period is, typically, between about 2 ns and about 50 ns. Advantageously, as the TOF sensor pixel 300 performs in-pixel subtraction with each clock cycle, only the differential photocharge 303 or 304 accumulates over the integration period.

At the end of the first integration period, the first capacitor 360 provides a first-period differential photocharge 303, corresponding to a first-period capacitor voltage $V_1$. The first-period capacitor voltage $V_1$ is related to the time of flight of the light pulses, which in turn is related to the distance to the target 240. When the light pulses have a square waveform, the first-period capacitor voltage $V_1$ is substantially proportional to the time of flight of the light pulses and to the distance to the target 240. The first-period capacitor voltage $V_1$ is read, for example, by an analog-to-digital converter, and provided to the processing system 230.

After the TOF sensor pixel 300 is re-initialized, as described heretofore, the second integration period, which is used to correct for distance aliasing, is carried out. Examples of de-aliasing methods are described in U.S. Pat. No. 7,791,715 to Bamji, issued on Sep. 7, 2010, and in U.S. Patent Application Publication No. 2011/0188028 to Hui, et al., published on Aug. 4, 2011, which are incorporated herein by reference.

Typically, the second integration period has substantially the same length as the first integration period. At the end of the second integration period, the first capacitor 360 provides a second-period differential photocharge 304, corresponding to a second-period capacitor voltage $V_2$, which is also related to the time of flight of the light pulses. The second-period capacitor voltage $V_2$ is read, for example, by an analog-to-digital converter, and provided to the processing system 230.

The processing system 230 receives the first-period capacitor voltage $V_1$ and the second-period capacitor voltage $V_2$ from each TOF sensor pixel 300 in the TOF sensor 220. The processing system 230 is configured, through design and/or programming, to use these voltage values to determine the distance to the target 240. When the TOF sensor is a depth image sensor, the voltage values are used to determine the distance to each point of the target 240, allowing a depth image of the target 240 to be captured.

For each TOF sensor pixel 300, the processing system 230, typically, calculates the ratio $V_1/V_2$ of the first-period capacitor voltage to the second-period capacitor voltage and uses the ratio $V_1/V_2$ to determine the distance to the target 240. Preferably, the TOF system 200 is calibrated, prior to use, by measuring the ratio $V_1/V_2$ for a target 240 at various distances from the TOF system 200. These measurements are used to build a look-up table of ratio values and corresponding distance values, which is stored in the memory 233 of the processing system 230. In operation, the processing system 230, preferably, compares the calculated ratio $V_1/V_2$ to the look-up table and uses an interpolation algorithm to determine the distance to the target 240.

In other embodiments, the second integration period may be replaced by an integration period carried out at a different phase delay and/or at a different clock frequency. In yet other embodiments, the first and second integration periods may be carried out simultaneously in a pair of TOF sensor pixels 300.

It should be noted that in embodiments where the second integration period is not the same length as the first integration period, or where the second integration period is carried out at a different clock frequency from the first integration period, the distance to the target 240 may or may not be a function of the ratio $V_1/V_2$. In some instances, the distance to the target 240 may be a function of both the first-period capacitor voltage $V_1$ and the second-period capacitor voltage $V_2$, i.e., two parameters, rather than the ratio $V_1/V_2$, i.e., one parameter.

Of course, numerous other embodiments may be envisaged without departing from the spirit and scope of the invention.

We claim:

1. A time-of-flight (TOF) system, comprising:
   a light source for emitting light pulses at a clock frequency;
   a TOF sensor including one or more TOF sensor pixels, each TOF sensor pixel including:
      a photodetector for detecting the light pulses, after a time of flight, to provide a photocurrent;
      a capacitor for integrating the photocurrent, over a first integration period, to provide a first-period photocharge, corresponding to a first-period capacitor voltage, at an end of the first integration period; and
      circuitry for reversing a flow direction of the photocurrent through the capacitor at twice the clock frequency, during the first integration period, so that the first-period photocharge is a differential photocharge, and the first-period capacitor voltage is related to the time of flight of the light pulses.

2. The TOF system of claim 1, wherein each TOF sensor pixel includes only one photodetector for detecting the light pulses, and only one capacitor for integrating the photocurrent.

3. The TOF system of claim 1, wherein the photodetector is for detecting background light, as well as the light pulses; wherein the photocurrent has a contribution from the background light; and wherein the first-period photocharge has substantially no contribution from the background light.

4. The TOF system of claim 1, wherein the light source is for emitting the light pulses towards a target; wherein the photodetector is for detecting the light pulses reflected by the target; further comprising a processing system, connected to the light source and the TOF sensor, for determining a distance to the target by using the first-period capacitor voltage.

5. The TOF system of claim 1, wherein the light source is for emitting the light pulses in response to a clock signal; and wherein the circuitry is for reversing the flow direction of the photocurrent through the capacitor in response to the clock signal and an inverted clock signal, during the first integration period.

6. The TOF system of claim 5, further comprising a processing system, connected to the light source and the TOF sensor, including a clock for providing the clock signal.

7. The TOF system of claim 5, wherein the circuitry includes:
   a first set of transistors, each having a control input for receiving the clock signal during the first integration period; and
   a second set of transistors, each having a control input for receiving the inverted clock signal during the first integration period.

8. The TOF system of claim 5, wherein the capacitor is also for integrating the photocurrent, over a second integration period, to provide a second-period photocharge, corresponding to a second-period capacitor voltage, at an end of the second integration period; and wherein the circuitry is also for reversing the flow direction of the photocurrent through the capacitor at twice the clock frequency in response to a 90°-phase-delayed clock signal and a 270°-phase-delayed clock signal, during the second integration period, so that the second-period photocharge is a differential photocharge, and the second-period capacitor voltage is related to the time of flight of the light pulses.

9. The TOF system of claim 8, further comprising a processing system, connected to the light source and the TOF sensor, for calculating a ratio of the first-period capacitor voltage to the second-period capacitor voltage.

10. The TOF system of claim 9, wherein the light source is for emitting the light pulses towards a target; wherein the photodetector is for detecting the light pulses reflected by the target; wherein the processing system is also for determining a distance to the target by comparing the ratio of the first-period capacitor voltage to the second-period capacitor voltage to a look-up table of ratio values and corresponding distance values.

11. A time-of-flight (TOF) sensor pixel, comprising:
   a photodetector for detecting light pulses emitted at a clock frequency, after a time of flight, to provide a photocurrent;
   a capacitor for integrating the photocurrent, over a first integration period, to provide a first-period photocharge, corresponding to a first-period capacitor voltage, at an end of the first integration period; and
   circuitry for reversing a flow direction of the photocurrent through the capacitor at twice the clock frequency, during the first integration period, so that the first-period photocharge is a differential photocharge, and the first-period capacitor voltage is related to the time of flight of the light pulses.

12. The TOF sensor pixel of claim 11, wherein the TOF sensor pixel includes only one photodetector for detecting the light pulses, and only one capacitor for integrating the photocurrent.

13. The TOF sensor pixel of claim 11, wherein the photodetector is for detecting background light, as well as the light pulses; wherein the photocurrent has a contribution from the background light; and wherein the first-period photocharge has substantially no contribution from the background light.

14. The TOF sensor pixel of claim 11, wherein the circuitry is for reversing the flow direction of the photocurrent through the capacitor in response to a clock signal and an inverted clock signal, during the first integration period.

15. The TOF sensor pixel of claim 14, wherein the circuitry includes:
a first set of transistors, each having a control input for receiving the clock signal during the first integration period; and
a second set of transistors, each having a control input for receiving the inverted clock signal during the first integration period.

16. The TOF sensor pixel of claim 14, wherein the capacitor is also for integrating the photocurrent, over a second integration period, to provide a second-period photocharge, corresponding to a second-period capacitor voltage, at an end of the second integration period;
and wherein the circuitry is also for reversing the flow direction of the photocurrent through the capacitor at twice the clock frequency in response to a 90°-phase-delayed clock signal and a 270°-phase-delayed clock signal, during the second integration period, so that the second-period photocharge is a differential photocharge, and the second-period capacitor voltage related to the time of flight of the light pulses.

17. A method of determining a distance to a target, comprising:
emitting light pulses towards a target at a clock frequency;
detecting the light pulses reflected from the target, after a time of flight, to provide a photocurrent;
integrating the photocurrent with a capacitor, over a first integration period, to provide a first-period photocharge, corresponding to a first-period capacitor voltage, at an end of the first integration period;
reversing a flow direction of the photocurrent through the capacitor at twice the clock frequency, during the first integration period, so that the first-period photocharge is a differential photocharge, and the first-period capacitor voltage is related to the time of flight of the light pulses; and
determining a distance to the target by using the first-period capacitor voltage.

18. The method of claim 17, wherein the light pulses are emitted in response to a clock signal; and wherein the flow direction of the photocurrent through the capacitor is reversed in response to the clock signal and an inverted clock signal, during the first integration period;
further comprising:
integrating the photocurrent, over a second integration period, with the capacitor to provide a second-period photocharge, corresponding to a second-period capacitor voltage, at an end of the second integration period; and
reversing the flow direction of the photocurrent through the capacitor at twice the clock frequency in response to a 90°-phase-delayed clock signal and a 270°-phase-delayed clock signal, during the second integration period, so that the second-period photocharge is a differential photocharge, and the second-period capacitor voltage is related to the time of flight of the light pulses.

19. The method of claim 18, wherein determining the distance to the target includes calculating a ratio of the first-period capacitor voltage to the second-period capacitor voltage.

20. The method of claim 19, wherein determining the distance to the target further includes comparing the ratio of the first-period capacitor voltage to the second-period capacitor voltage to a look-up table of ratio values and corresponding distance values.

* * * * *